(12) United States Patent
Steen et al.

(10) Patent No.: US 7,302,333 B2
(45) Date of Patent: Nov. 27, 2007

(54) METHOD AND ARRANGEMENT FOR AUTOMATED CONTROL OF A VEHICULAR DRIVE TRAIN

(75) Inventors: Marcus Steen, Angered (SE); Anders Eriksson, Göteborg (SE)

(73) Assignee: Volvo Lastvagnar AB, Gothenburg (SE)

( * ) Notice: Subject to any disclaimer, the term of this patent is extended or adjusted under 35 U.S.C. 154(b) by 24 days.

(21) Appl. No.: 11/164,001

(22) Filed: Nov. 7, 2005

(65) Prior Publication Data
US 2006/0237249 A1 Oct. 26, 2006

Related U.S. Application Data

(63) Continuation of application No. PCT/SE2004/000625, filed on Apr. 23, 2004.

(30) Foreign Application Priority Data
May 7, 2003 (SE) .................................... 0301334

(51) Int. Cl.
*G06F 19/00* (2006.01)
(52) U.S. Cl. ..................... 701/87; 701/54; 701/84; 180/197
(58) Field of Classification Search .................. 701/51, 701/54, 80, 82, 83–88, 91; 180/197
See application file for complete search history.

(56) References Cited

U.S. PATENT DOCUMENTS

| | | | | |
|---|---|---|---|---|
| 5,090,511 A | * | 2/1992 | Kabasin | 180/197 |
| 5,732,380 A | * | 3/1998 | Iwata | 701/85 |
| 5,897,601 A | * | 4/1999 | Suzuki | 701/78 |
| 6,334,500 B1 | * | 1/2002 | Shin | 180/197 |
| 6,383,116 B1 | | 5/2002 | Warren et al. | |
| 6,909,959 B2 | * | 6/2005 | Hallowell | 701/88 |
| 2006/0080022 A1 | * | 4/2006 | Hrovat et al. | 701/82 |
| 2006/0080023 A1 | * | 4/2006 | Hrovat et al. | 701/82 |

FOREIGN PATENT DOCUMENTS

EP 1266 788 B1 5/2007

* cited by examiner

*Primary Examiner*—Gary Chin
(74) *Attorney, Agent, or Firm*—Novak Druce & Quigg, LLP

(57) ABSTRACT

Method and arrangement for automated control of a drive train (10) of a land vehicle to be executed when ground conditions exist that impede the initiation or continuation of travel of the vehicle such as being stuck on loose or slippery ground. The automated routine induces a rocking action in the vehicle purposed to aid in freeing the vehicle and permitting desired travel out of the area. As an initial step of the routine, it is determined whether such a ground condition exists. If so, drive power is applied, via a drive train (10) of the vehicle until the drive wheel (26, 30) bogs down or productive and continuous travel is established in the vehicle. A rocking-back action is permitted by a discontinuation of the drive power to the drive wheel (26, 30) of the land vehicle until a predetermined power resumption condition occurs. Reverse power can be optionally applied at this time. Otherwise, drive power is reapplied to the drive wheel (26, 30) for another attempt at forward progress. All of these actions are controlled via an automated drive train control routine that executes the method, typically responsive to a driver-initiated signal.

18 Claims, 4 Drawing Sheets

METHOD AND ARRANGEMENT FOR AUTOMATED CONTROL OF A VEHICULAR DRIVE TRAIN

CROSS-REFERENCE TO RELATED APPLICATIONS

The present application is a continuation patent application of International Application No. PCT/SE2004/000625 filed 23 Apr. 2004 which was published in English pursuant to Article 21(2) of the Patent Cooperation Treaty, and which claims priority to Swedish Application No. 0301334-9 filed 7 May 2003. Said applications are expressly incorporated herein by reference in their entireties.

TECHNICAL FIELD OF THE INVENTION

The present invention relates to systems and methods for controlling the start-up or launch of a land vehicle, and more particularly to heavy-duty vehicles operating on unfavorable ground conditions such as those typically found off-road where travel paths can be littered with debris and eroded with holes and troughs or be composed of loose dirt.

BACKGROUND ART

Land vehicles, including automotive vehicles, and in particular heavy-duty vehicles such as logging trucks and trucks used on construction sites, when launched or started off under off-road and similar conditions, can be stuck because the drive wheels experience reduced traction on the ground. Experienced drivers have developed strategies for solving this problem, such as engaging a lateral differential lock, or engaging a longitudinal differential lock, or lifting a set of wheels so that the weight on each remaining wheel is increased. A more elaborate method, known as rocking, involves intermittently transmitting power to the drive wheels. More specifically, the driver repeats a sequence in which the power transmitted to the drive wheels is first increased until the wheels spin, and subsequently releases the accelerator pedal and disengages the main clutch. An even more elaborate version of the method involves alternately changing from a forward gear ratio to a reverse gear ratio.

Several other ground conditions can present similar challenges. For example, if the vehicle comes to rest with one or more wheels in a trough, ditch or similar depression, engine power can be insufficient to launch the vehicle out of the depression and into productive travel. Similarly, if a log, ridge, mound or other impediment is located ahead of one or more of the vehicle's wheel(s) prior to launch, similar difficulties can be experienced getting the vehicle to launch into travel. In a more generic sense, these several start-up challenging conditions can be collectively referred to as impedances or impediments to the initiation or continuation of travel of the land vehicle.

With regard to the above-described rocking methods for initiating vehicle launch, great skill and experience is required since the driver, seated in the cab of the vehicle has little information about the real state of wheel spin and has to react quickly to achieve the desired effects. For this reason, novice drivers, at least with respect to these more difficult driving conditions, are often left at a disadvantage when compared to their more experienced counterparts. Moreover, these methods are often found to be incompatible with transmission and traction control systems utilized in modern heavy-duty vehicles.

Many semi-automatic transmission systems include means for automatically selecting a predetermined start-up gear when the vehicle is started up from a standstill condition. However, it has been suggested in U.S. Pat. No. 6,383,116 to allow the driver to operate the gear-selector lever for selecting a higher start-up gear than the predetermined start-up gear that would otherwise be automatically selected by the electronic controller. This method can be appropriate when traction is reduced on a non-deformable road surface, for instance, due to ice or a thin layer of snow. Such a strategy, however, is of little or no use when the ground surface is deformable, such as in the woods or on a construction site because in those cases the drive wheels must be allowed to churn through the deformable surface for finding traction on more solid, often underlying, ground.

It has further been suggested in WO 02/04242 to adapt a vehicle traction control system for operation upon a deformable ground surface by increasing the amount of slip permitted by the traction control system for the drive wheels and thereby allow the wheels to churn through the deformable surface. The vehicle traction control system is actuated when drive wheel slip exceeds a predetermined slip threshold in order to reduce the amount of drive wheel slip by reducing drive wheel speed. The traction control system also monitors vehicle deceleration. Upon detecting that the vehicle is decelerating and that the vehicle deceleration has exceeded a deceleration threshold, the traction control determines that the vehicle has encountered a deformable surface such as mud or deep snow. Upon detecting entry onto a deformable surface, the slip threshold is linearly increased over period of time to increase the drive wheel speed. This control routine does not, however, provide a method for starting-up from standstill.

SUMMARY OF THE INVENTION

An objective of the present invention is to provide both methods and/or devices that are adapted for controlling the start-up of a vehicle, in particular, a heavy-duty vehicle when certain start-up impeding ground conditions prevail, such as loose-dirt conditions often encountered off-road, and which can be implemented by drivers having little experience and developed driving skills for such conditions. In an associated aspect, it is preferred that the implementing systems and methods make use of signals and controls currently available in automatic, semi-automatic transmission systems and/or vehicle traction control systems.

In a general sense, the present invention is modeled to mimic those strategies that experienced drivers have developed for achieving vehicle start-up or launch when travel-impeding conditions are encountered as described hereinabove. These conditions include, but are not limited to loose and muddy soil, and uneven terrain having depressions and troughs, and ridges and rises, that can be difficult for a heavy-duty vehicle to surmount upon launch from a standstill position, or slow-moving operation. In that drive trains of most land vehicles, and especially heavy-duty vehicles, have at least semi-automated control systems, the present invention provides an automated control strategy, that when implemented, enables any operator, regardless of experience level, to maximize the capabilities of his or her vehicle to be driven out of stuck conditions, and other situations that otherwise make launching into travel difficult.

The invention(s) may be characterized in the form of one or more of several different embodiments. One embodiment is the method that implements the disclosed launch or start-up strategy for a vehicle, via drive train control.

Another embodiment is the systems and devices, either on or associated with the vehicle, through which these strategies are implemented.

Since an important aspect of these control strategies is the fact that they can be automated on the vehicle utilizing control processors and programmed computer readable media, these programmable control systems constitute another embodiment of the invention. Associated therewith, is another embodiment constituted by the executable computer program, itself, as a product, that affects, when run, execution of the prescribed strategies.

In a first exemplary embodiment, the invention takes the form of a method for automated control of a drive train of a land vehicle to be executed when ground conditions exist that impede the initiation of travel of the vehicle. The method includes (comprises) determining that a ground condition exists that impedes an initiation of travel of the land vehicle. Examples of the various possibilities of terrain that can present such impediments are described herein. The determination that such a condition exists is preferably driver-indicated, but can be automatically deduced from vehicle operating and/or travel conditions. Drive power is applied, via a drive train of the vehicle, to a drive wheel of the land vehicle in an attempt to cause productive travel of the vehicle. The application of power has been described as being to a drive wheel of the vehicle, but it should be understood that power can be applied to any number of drive wheels on any particular vehicle of concern. Still further, productive travel should be understood to define continuous travel across the ground, for as long as the operator demands, without undue bogging down of the drive wheels, or insurmountable impasses being encountered such as the depressions and ridges that have been described and which can prevent the vehicle in question from launching directly into travel. The application of drive power is continued until a predetermined condition of unproductive vehicle travel progress has been detected. This condition of unproductive vehicle travel progress is prescribed as a sensed condition indicative that travel progress of the powered vehicle, relative to the ground desired to be traversed, has fallen below a threshold measure. As intimated above, undue bogging down of the drive wheel that results in either an absolute or near cessation of travel relative to the ground constitutes an example of such unproductive vehicle travel progress. The method also includes controlling, via an automated drive train control routine, execution of the application step of drive power to the drive wheel in an attempt to cause productive travel of the vehicle responsive to a driver-initiated signal. As the invention is defined in this exemplary embodiment, it should be appreciated that the driver may believe that sufficiently unfavorable conditions exist that warrant utilization of the launch control and enable execution of the control routine, but in actuality the conditions are such that launch directly into productive travel is possible. In this case the automated drive train control routine has been initiated, but launch is achieved without interruption to the delivery of power to the drive wheels.

In an enhancement of the immediately above-described method, the invention can further include discontinuing drive power to the drive wheel of the land vehicle until a predetermined power resumption condition occurs. Looking to the analogy of a driver-executed rocking of the vehicle, once progress of the vehicle has slowed, power is cut to the drive wheels and the vehicle rocks in a reverse direction. A power resumption condition occurs when the backward rocking action has either terminated, or nearly terminated. When the power resumption condition occurs, drive power is reapplied to the drive wheel of the land vehicle for the purpose of continuing productive powered travel of the land vehicle. Again, this step can be analogized to the next powered rock in the direction of desired travel so the vehicle continues powered travel in the desired direction. As indicated above, these additional steps may be integrated for controlling, via the automated drive train control routine, the execution of the application, discontinuation, and reapplication of drive power to the drive wheel of the land vehicle responsive to the driver-initiated signal.

In further potentiation of the methods defined hereinabove, additional augmentation can be achieved to the control routine by applying a reverse direction drive power, via the drive train of the vehicle, to the drive wheel of the land vehicle between the steps of discontinuation and reapplication of drive power to the drive wheel. The application of reverse direction drive power is continued until a predetermined condition of unproductive vehicle reverse travel progress has been detected. Similarly as defined above for unproductive forward travel progress, a condition of unproductive vehicle reverse travel progress is prescribed as a sensed condition indicative that reverse travel progress of the powered vehicle, relative to the ground desired to be traversed, has fallen below a threshold measure. Typically, the conditions that characterize unproductive forward travel similar characterize unproductive reverse travel.

If the thus prescribed forward-reverse-forward controlled powered rock routine has not enabled launch of the vehicle, the method optionally continues with a repeat, following an initial application of drive power to the drive wheel of the land vehicle, of the steps of discontinuation, reverse application, and reapplication of drive power to the drive wheel of the land vehicle until a predetermined condition of continued productive travel is determined. Examples that can constitute signals of such continued productive travel will be exemplified hereinbelow. It should also be appreciated that the repeating process can also be implemented in embodiments that do not incorporate the aspect of reverse application of power; that is, if reverse powering is not included, repeated forward powered rocking, with powered reverse recoil permitted therebetween, is also contemplated.

In a further aspect, the automated travel initiation control mode can be caused to be disabled when the predetermined condition of continued productive travel is detected. This step signifies an optional quality of the inventive method that requires the operator to re-initialize execution of the above-defined launch process after a period of productive travel has occurred in an effort to assure that unintentional execution of the routine is avoided.

As intimated above, it is preferred that enablement of the launch routine defined herein is dependent on driver initiation. In a related embodiment, execution of the routine is permitted only when the driver has manually selected an automated travel initiation control mode for the drive train of the vehicle.

In one embodiment, the driver-initiated signal that initiates the automated drive train control routine is depression of an accelerator. Still further, the degree of depression of the accelerator can be either ignored, or utilized as an input for a function that prescribes how much drive torque is delivered to the drive wheel during the various stages of the defined routines. In a related aspect, execution of the routine, and in turn the launch attempt, may be aborted based on detecting that the accelerator has been released by the driver, or at least released past a predetermined threshold accelerator position.

As an exemplary embodiment, the detection of a predetermined condition of unproductive vehicle travel progress can be based on at least one signal selected from the group consisting of: a non-driven wheel speed signal; a drive wheel speed signal; a drive train revolution speed signal; a drive train torque signal; a vehicle speed signal; an acceleration signal of a suspended body of the vehicle; and an acceleration signal of non-suspended part of the vehicle. The selected signal is compared with a predetermined threshold value for controlling execution of the automated drive train control routine.

In one embodiment, productive vehicle travel progress is differentiated from unproductive vehicle travel progress based on a comparison between rotational speeds of the driven wheel and a non-driven wheel. In an alternative embodiment, the inventive method differentiates productive from unproductive vehicle travel progress based on a comparison between rotational speed of the driven wheel and a measured ground speed of the vehicle.

The automated drive train control routine can be exemplarily disabled based upon the occurrence of any one or more of the following conditions: a predetermined distance of productive travel of the vehicle is achieved; a predetermined speed of the vehicle is achieved; a brake pedal of the vehicle is depressed; depression of the accelerator of the vehicle is released; depression of the accelerator of the vehicle is released past a predetermined accelerator position threshold value; and a driver-initiated disabling command is received.

From a system perspective, an embodiment of the invention takes the form of a land vehicle drive train control device including a processor and readable medium configured and programmed to execute the above-described methods. An alternative embodiment contemplates the incorporation of the systems into a land vehicle.

In that the methods and the devices for implementing those methods are preferably computer based, additional embodiments of the invention are considered to be constituted by computer readable medium having program code adapted to, upon execution, perform the disclosed methods of the invention. A related embodiment takes the form of a computer program product that includes program code, on a computer readable medium, adapted to perform the inventive methods.

The methods described herein can be implemented both for forward and rearward start-up, depending on the input of the driver. The off-road start-up mode of the vehicle can be determined on the basis of a manual input of the driver. Alternatively, it can also be determined automatically; for example, based on conditions determined during previous operation of the vehicle, before the vehicle has come to a standstill. It can also be determined automatically after a first unsuccessful attempt to start up the vehicle without implementing the method, on the basis of measurements carried out during this unsuccessful attempt. Advantageously, initiation of the off-road start-up mode will be allowed only if the vehicle is at standstill or almost at standstill.

According to one embodiment, the step of transmitting power to a drive wheel includes at least one of the following steps: (1) engaging a gear of an automatic transmission of the drive train in the desired travel direction; (2) controlling an engine of the drive train to increase the engine torque; and/or (3) engaging a main clutch of the drive train. Advantageously, control of the engine can include controlling the engine torque as a function of the degree of depression imparted to the accelerator pedal by the driver. In this manner, the driver can determine how much power is to be transmitted to the drive wheel(s). This feature also provides to the operator a feeling of control over the vehicle that might otherwise be lost in a completely independent control routine. This is particularly useful when the vehicle exits the automated off-road start-up procedure.

It is contemplated that a determination that the vehicle is stuck may be deduced from the sensing of one or more of the following signals: (1) a non-driven wheel speed signal; (2) a drive wheel speed signal; (3) a drive train revolution speed signal; (4) a drive train torque signal; (5) a vehicle speed signal; (6) an acceleration signal of a suspended part of the vehicle; (7) and an acceleration signal of a non-suspended part of the vehicle. The ultimate determination that a stuck condition exists is based on a comparison of the sensed quantity against a predetermined quantity known to indicate a stuck condition. The known quantity may be couched in terms of a threshold, beyond which a stuck condition is indicated.

The vehicle speed is most typically assessed based on the rotational speed of a non-driven wheel. Alternatively, however, radar, optical (camera) or GPS (Global Positioning System) signals can provide a measure of the vehicle's speed relative to ground, especially if all wheels of the vehicle are driven. The acceleration of the vehicle can be derived from the vehicle speed signal, or directly measured by an accelerometer.

Preferably, a stuck condition is determined based on a function that compares a rotational speed signal of one or more drive wheels to a rotational speed signal of one or more non-driven wheels. With respect to the method steps of the invention, wheel spin has been identified as a reliable indicator of when power should be interrupted to a slipping drive wheel. It should, however, be appreciated that a certain amount of slip of the drive wheel should be allowed since the wheel should be allowed to churn through the deformable surface. Too much wheel spin, however, should be avoided. Advantageously, both (1) the vehicle speed or acceleration and (2) wheel spin are used conjointly: more wheel spin may thus be allowed, if it enables the vehicle to accelerate.

The amount of permitted spin can be a predetermined constant value. Permitted spin can also be determined as a function of a degree of operator-depression of the accelerator pedal. In this manner, the driver influences the amount of wheel spin allowed thereby beneficially enhancing the driver's sense of control as earlier described. It is also contemplated that the degree of permitted spin can be automatically adjusted (increased and/or decreased) via the control routine between each iterative attempt to free the vehicle and commence productive progress or travel.

Advantageously, the step of discontinuing or interrupting the transmission of power to the drive wheel includes one or more of the following steps: (1) controlling an engine of the drive train to decrease the engine torque; (2) disengaging a main clutch of the drive train; (3) and disengaging an automatic transmission of the drive train.

After the power has been interrupted, and the vehicle is allowed to roll in reverse, or is powered in reverse, a power-resume condition eventually occurs as described hereinabove. Advantageously, determination that power should be resumed can be based, at least in part, on one or more of the following parameters: (1) a speed signal of a non-driven wheel; (2) a speed signal of the vehicle; (3) an acceleration signal of a suspended body of the vehicle; (4) an acceleration signal of non-suspended part of the vehicle. Typically, the measured parameter is mapped to a look-up table of the system, and based thereupon, resumption of power is, or is not, applied to the drive wheel.

If successful, the backward and forward rocking motion induced in the vehicle enables the vehicle to eventually achieve productive progress and drive out of the impeding condition (s) in a desired predetermined direction. Therefore, it is important that the routine recognize an exit condition indicative of productive progress or travel having been achieved. Qualities that the control routine can assess in an effort to determine that an exit condition exists include: (1) sensing whether the vehicle has covered more than a certain travel distance; (2) sensing whether the vehicle speed is above a vehicle speed threshold value; (3) sensing whether the brake pedal is depressed; (4) sensing whether the accelerator pedal has been released; and/or (5) sensing whether an operator-input has been received at a driver interface of the system.

Preferably, several conditions can be monitored simultaneously, and one or more considered in the control routine. Depending on the type of vehicle, additional features can be incorporated into the routine to enhance the effects of the method. Examples include engaging a lateral differential lock of the drive train; enabling a traction control procedure controlling individual wheel brakes for reducing the difference between a right drive wheel speed and a left drive wheel speed; inhibiting a traction control procedure of the vehicle that controls individual wheel brakes for reducing the difference between drive wheel speeds and non-driven wheel speeds; and engaging a longitudinal differential lock of the drive train.

Regarding forward and reverse application of power, both fore and aft swing or rocking motion of the vehicle is assisted so that the amplification of the momentum of the vehicle is more effective. Preferably, the method determines whether to carry out the step of adding reverse power based on a manual selection made by the driver. This can be an important feature since added-reverse should only be implemented when travel backward is safe and feasible. »Still further, independent initiation of reverse power could be quite startling to the driver.

The routine, as an option, can reduce to zero the power transmitted to the drive wheel when a reverse mode stop condition, or an indication that unproductive spin is occurring has been sensed. It is contemplated that this reverse mode stop condition may be based on such parameters as (1) the vehicle having covered more than a certain distance in the direction opposed to the desired travel direction and/or (2) the vehicle speed being above a vehicle speed threshold value in the direction opposed to the desired travel direction.

In most of the described embodiments, at least two parameters are considered for determining a stuck or launch-impeded condition: one parameter that is representative of the motion of the vehicle (non-driven wheel speed sensor, vehicle speed sensor, accelerometer) and another parameter that is representative of the dynamic behavior of the drive wheels (drive wheel speed sensor, transmission output shaft speed sensor driveline torque sensor).

BRIEF DESCRIPTION OF THE DRAWINGS

Other advantages and features of the invention will become more clearly apparent from the following description of one embodiment of the invention, given as a non-restrictive example only, and represented in the accompanying drawings in which.

DETAILED DESCRIPTION

Figure 1:
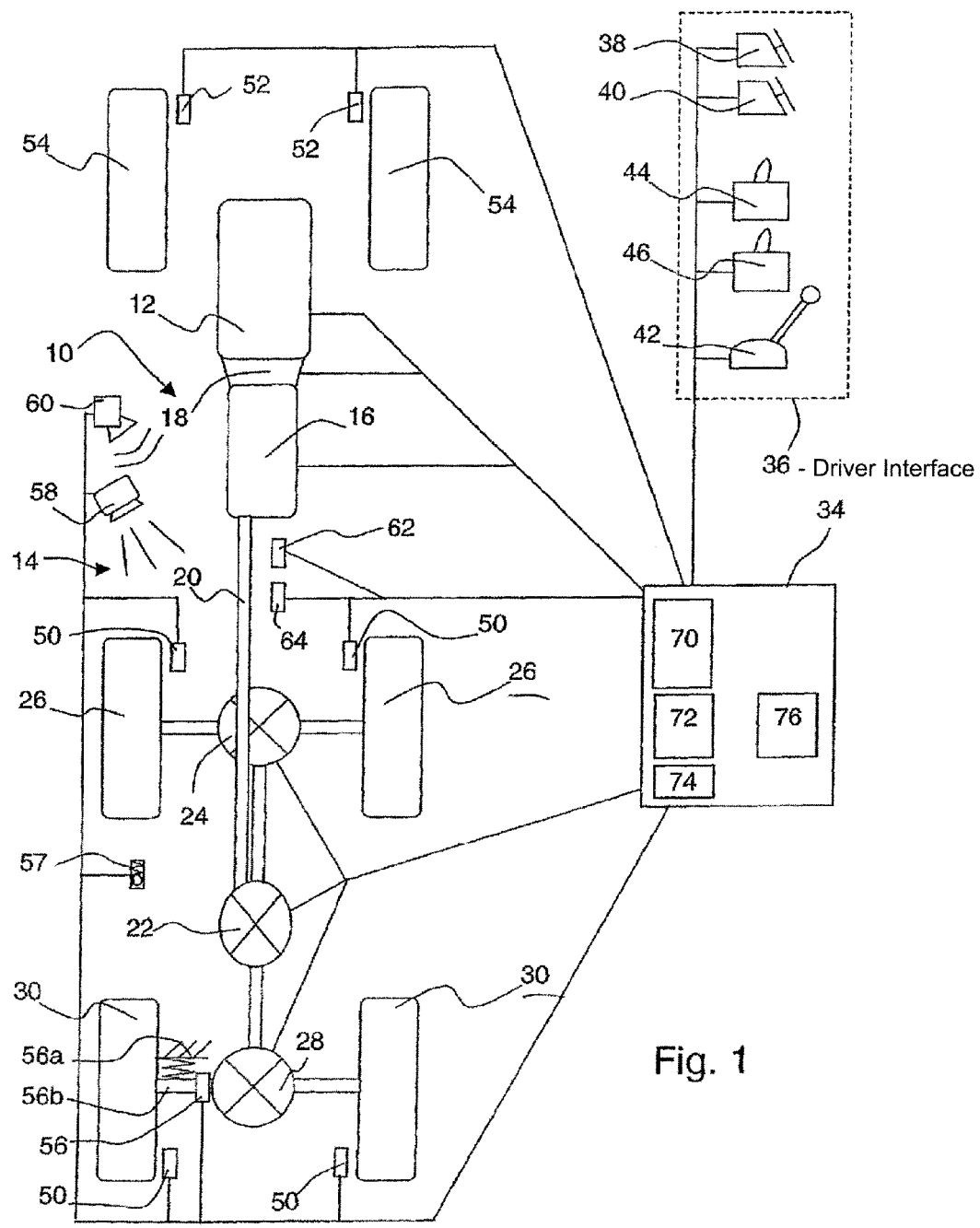
FIG. 1 is diagrammatic illustration of a drive train with a drive train control device in accordance with one aspect of the invention.

Referring to FIG. 1, a drive train 10 is shown including an internal combustion engine 12 and a driveline 14 for transmitting engine power to a first and a second set of drive wheels. The drive line 14 comprises (includes) an automatic transmission 16, a main clutch 18 positioned between the engine 12 and the automatic transmission 16, a propeller shaft 20 for transmitting power to a longitudinal transfer case 22 which transfers power to a first lockable transversal differential 24 for distributing the power to the first set of left and right drive wheels 26, and to a second lockable transversal differential 28 for distributing power to the second set of left and right drive wheels 30. The longitudinal transfer case is provided with a clutch or brake to discontinue power transmission to the first set of drive wheels 24. The transfer case may also be equipped to continuously change the ratio of power distribution between the first and second drive wheel sets. The driveline 14 can also include power take-offs, but which have not been shown.

A drive train control system or arrangement of the invention comprises an electronic control unit or controller 34 for regulating the output torque of the internal combustion engine 12, as well as the main clutch 18, the transmission 16, the longitudinal transfer case 22 and the lockable differentials 24,28. The electronic control unit 34 is connected to a driver interface 36 with sensors for detecting the position of an accelerator pedal 38, of a brake pedal 40, of a transmission selector lever 42, of a first selection switch 44 and of a second selection switch 46.

The electronic control unit 34 is also connected to a series of sensors for determining the motion of the vehicle. These sensors include one or more of the following: drive wheel speed sensors 50 for measuring a revolution speed of the drive wheels 26,30, non-driven wheels speed sensors 52 for measuring a revolution speed of non-driven wheels 54. The wheel speed sensors 50,52 can be part of an antilock braking system, but which is not shown. Additionally or alternatively, other sensors can be provided such as a distance sensor 56 for measuring the longitudinal distance between one point fixed relative to a suspended part of the vehicle such the vehicle chassis or the vehicle body 56a and another point fixed relative to a non-suspended part of the vehicle such as a wheel axle 56b, one or several longitudinal and/or vertical accelerometers 57 fixed on a suspended part of the vehicle and/or on the non-suspended part of the vehicle, a camera 58 or a radar 60. The camera and radar can be used either to measure the motion of the vehicle or to measure the motion of the suspended part of the vehicle with respect to the non-suspended part.

The electronic control unit is also connected to a series of sensors for determining the dynamic behavior of the drive train 10 and the actual state of the engine 12 and of the subunits of the driveline 14; e.g., an engine output shaft speed sensor, a driveline revolution speed sensor 62, a driveline torque sensor 64, and sensors for assessing the engaged state of the main clutch 18, of the longitudinal transfer case 22 and of the lockable transversal differentials 24,28.

It should be appreciated that the signals of the different sensors can be integrated or differentiated by analogical or digital means in the electronic control unit 34 to obtain new signals; e.g., the acceleration of the vehicle, the longitudinal velocity and/or acceleration of the chassis 56a with respect to the wheel axle 56b, the number of revolution of a propeller shaft. Further, signals of different sensors can also be combined to obtain new signals, for example, the driveline torque signal and driveline revolution speed signal can be combined to obtain a driveline power signal. Inputs from several sensors are also necessary to assess a wheel spin of the drive wheels of the vehicle. The wheel spin can be calculated as a difference between a revolution wheel of one or several of the drive wheels and a revolution speed of one or several non-driven wheel speed. Alternatively, the wheel spin can be assessed based on a comparison between a vehicle speed signal determined on the basis of one of the sensors 56,57, 58, 60 for detecting the motion of the vehicle on the one hand, and a drive wheel revolution speed signal or propeller shaft revolution speed signal on the other hand.

The electronic control unit comprises an engine control subunit 70 for controlling the engine power based on the position of the accelerator pedal 38, a main clutch control subunit 72 for controlling the main clutch 18, and a transmission control subunit 74 for controlling the transmission 16, the longitudinal transfer case 22 and of the lockable transversal differentials 24,28.

The electronic control unit 34 also contains a read-only memory 76 for storing a routine for controlling the start of the vehicle on soft surfaces. The electronic control unit 34 of the drive train control system follows the instructions contained in the routine whenever the vehicle is at standstill.

Figure 2:
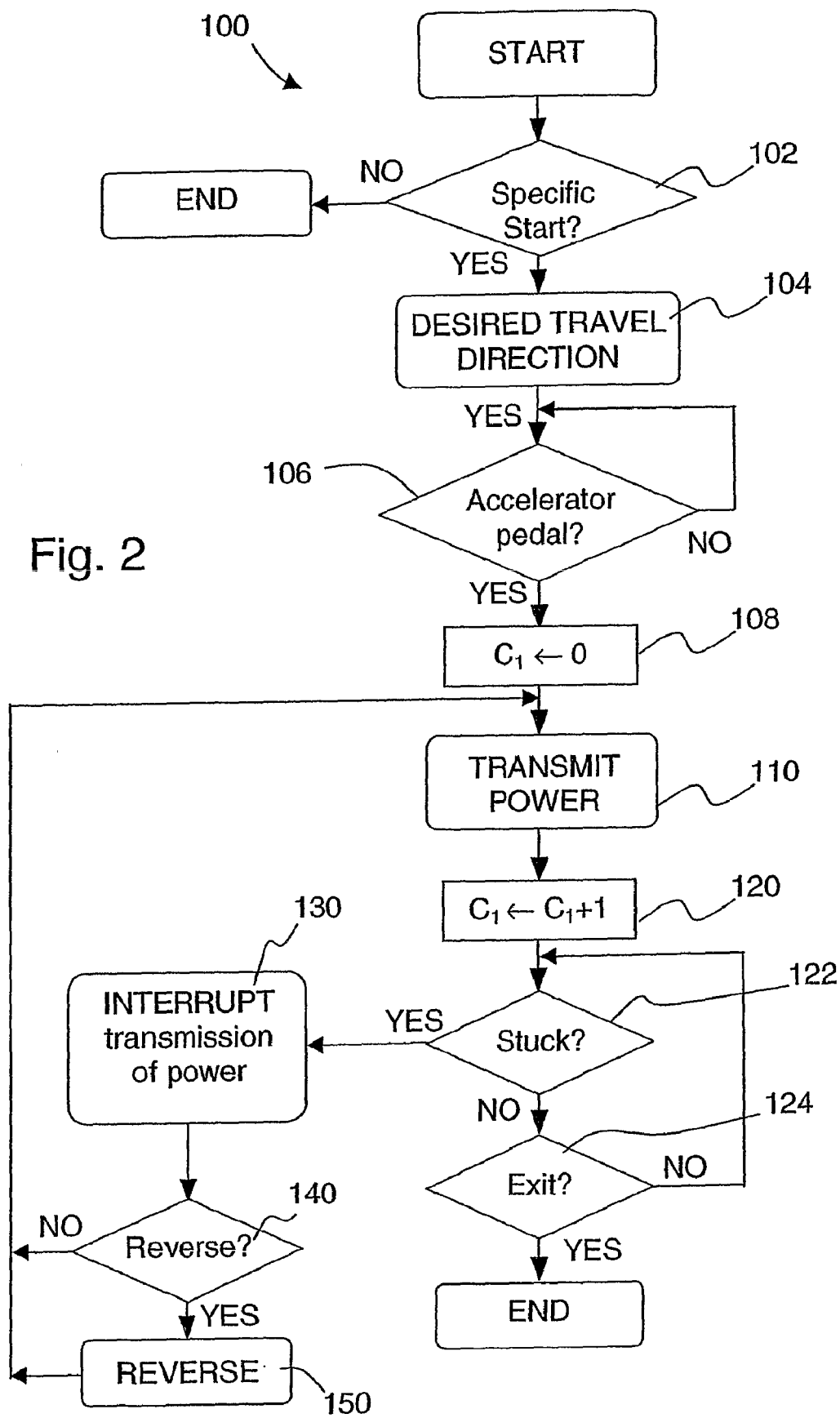
FIG. 2 is a flowchart illustrating process logic of a routine for controlling a start-up procedure in accordance with another aspect of the invention.

The routine 100 for controlling the start of the vehicle on soft surfaces is illustrated in FIG. 2. First, it is determined or decided in decision block 102 whether a specific start-up mode should be carried out. Preferably, this decision is taken on the basis of the position of switch 44. Alternatively or additionally, the electronic control unit 34 may automatically decide to run the routine based on the state of an off-road flag set during the previous operation of the vehicle, before the vehicle was stopped, and stored in a memory. Such a flag can be set for instance when a traction control device has determined that the vehicle has encountered a deformable surface such as mud or deep snow and stopped on that surface. An exemplary method for detecting that a vehicle has encountered a deformable surface is described in WO 02/04242; for this reason, the content of this publication is hereby expressly incorporated by reference in the disclosure of the present application.

Then the routine proceeds to function block 104 to determine a desired vehicle travel direction based on the position of the selector lever 42. The desired vehicle travel direction will be the forward direction whenever the selector lever 42 indicates a forward gear range or a forward transmission mode or a forward gear ratio. Inversely, it will be the backward direction whenever the lever 42 indicates a rearward gear range.

Then, the routine proceeds to decision block 106 where the depression of the accelerator pedal 38 is detected. When the depression of the accelerator pedal 38 has been detected, the routine proceeds to functional block 108 where a counter $C_1$ is reset to zero. The routine continues to function block 110 to operate the transmission of power to the drive wheels. In functional block 110, the electronic control unit 34 activates the engine control subunit 70 to determine the desired engine power based on the position of the accelerator pedal 38, activates the transmission control subunit 74 to engage a transmission ratio and activates the main clutch control subunit 72 to engage the main clutch. The transmission ratio can be the lowest gear ratio in the desired travel direction. It can also be determined based on the state of the counter $C_1$ and/or the position of the accelerator pedal 38 and/or the position of lever 42. The routine then continues to functional block 120 where the counter is incremented based on repeated iterations of the powering step.

In decision block 122, the electronic control unit determines if a stuck condition has been detected. The stuck condition is based on a comparison between a wheel spin value and a slip threshold.

If the wheel spin is lower than the slip threshold, the routine branches to decision block 124. In decision block 124, the electronic control unit decides if an exit condition is fulfilled. As examples, the exit condition is fulfilled if the counter $C_1$ is greater than a predetermined value, or if the vehicle speed is greater than a predetermined value, or if the vehicle has covered a predetermined distance in the desired travel direction. In these cases, the routine is terminated. Otherwise, the routine jumps back to decision block 122.

Figure 3:
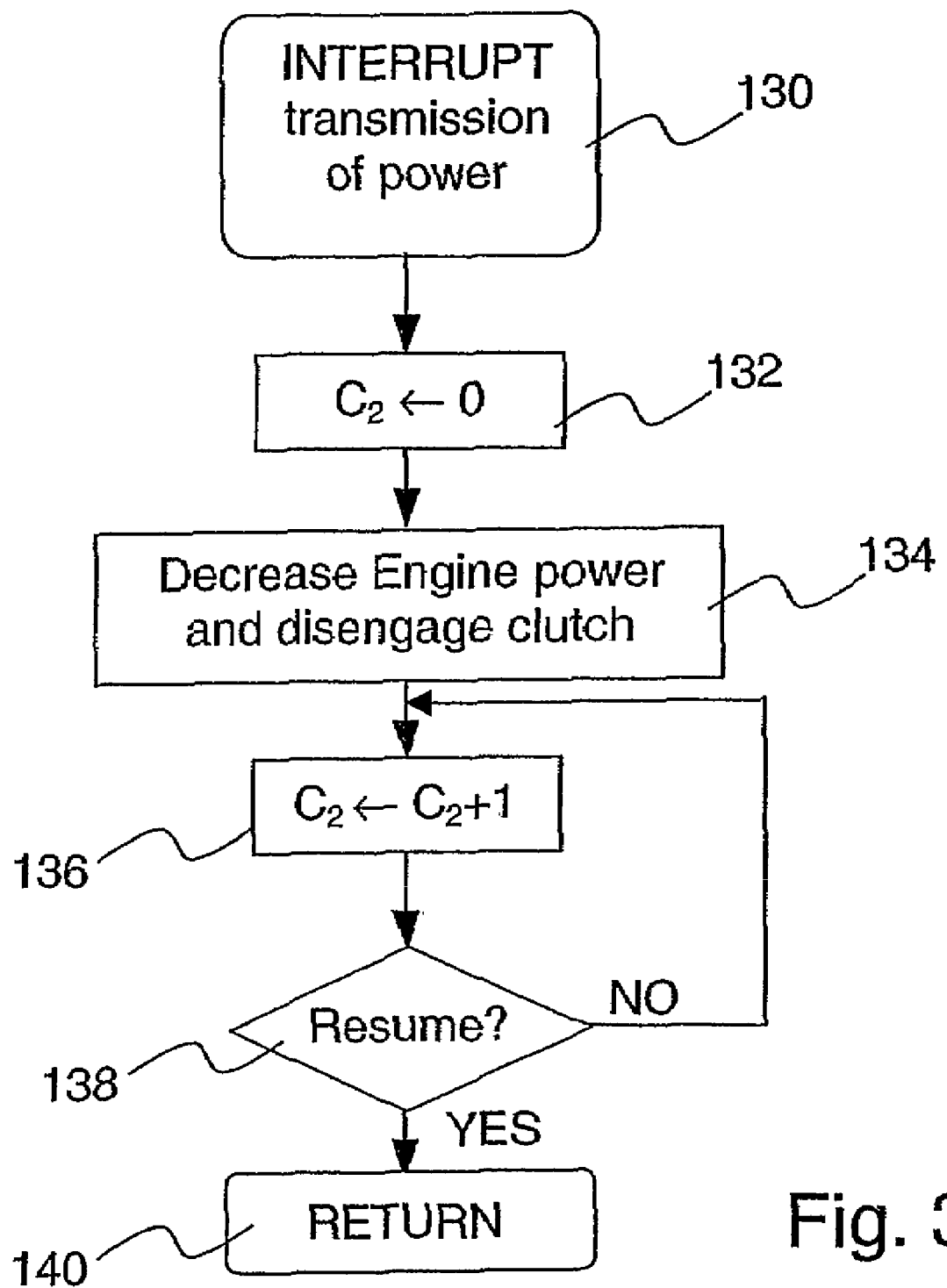
FIG. 3 is a flowchart illustrating process logic of a subroutine of the routine of FIG. 2.

If the wheel spin is greater than the slip threshold in decision block 122, the stuck condition is met and the routine branches to function block 130, which calls a subroutine INTERRUPT to interrupt the transmission of power to the drive wheels 26, 30. Subroutine INTERRUPT is illustrated in FIG. 3. First, in function block 132, a counter $C_2$ is reset to zero. Then, the subroutine moves to function block 134 to effect disengagement of the main clutch while the power of the engine is decreased. Then, the interruption counter is incremented in function block 136. The routine then proceeds to decision block 138 to detect whether a resume condition is met.

Depending on the signals that are available, this resume condition is met if the interruption counter value $C_2$ is greater than a predetermined value and/or if the vehicle speed is lower than a predetermined value and/or if the revolution speed of the non-driven wheels has changed sign or is lower than a predetermined value, and/or if the longitudinal velocity of the suspended part of the vehicle with respect to the non-suspended part has changed sign. It will be appreciated that the resume condition may depend on whether the desired travel direction is the forward or the rearward direction. If the resume condition is not met, the routine loops to function block 136 to increment the interruption counter $C_2$ and redo the test. If the resume condition is met in decision block 138, the subroutine returns to the main routine which proceeds to decision block 140 to decide whether a reverse control mode should be implemented.

This condition is met if the corresponding switch 46 on the driver interface has been switched on. If the condition is met, the routine moves to function block 150 to call a subroutine REVERSE, which carries out a reverse mode control and operates the transmission of power to the drive wheels in the direction opposed to the desired travel direction. Otherwise, the routine loops to function block 110.

Figure 4:
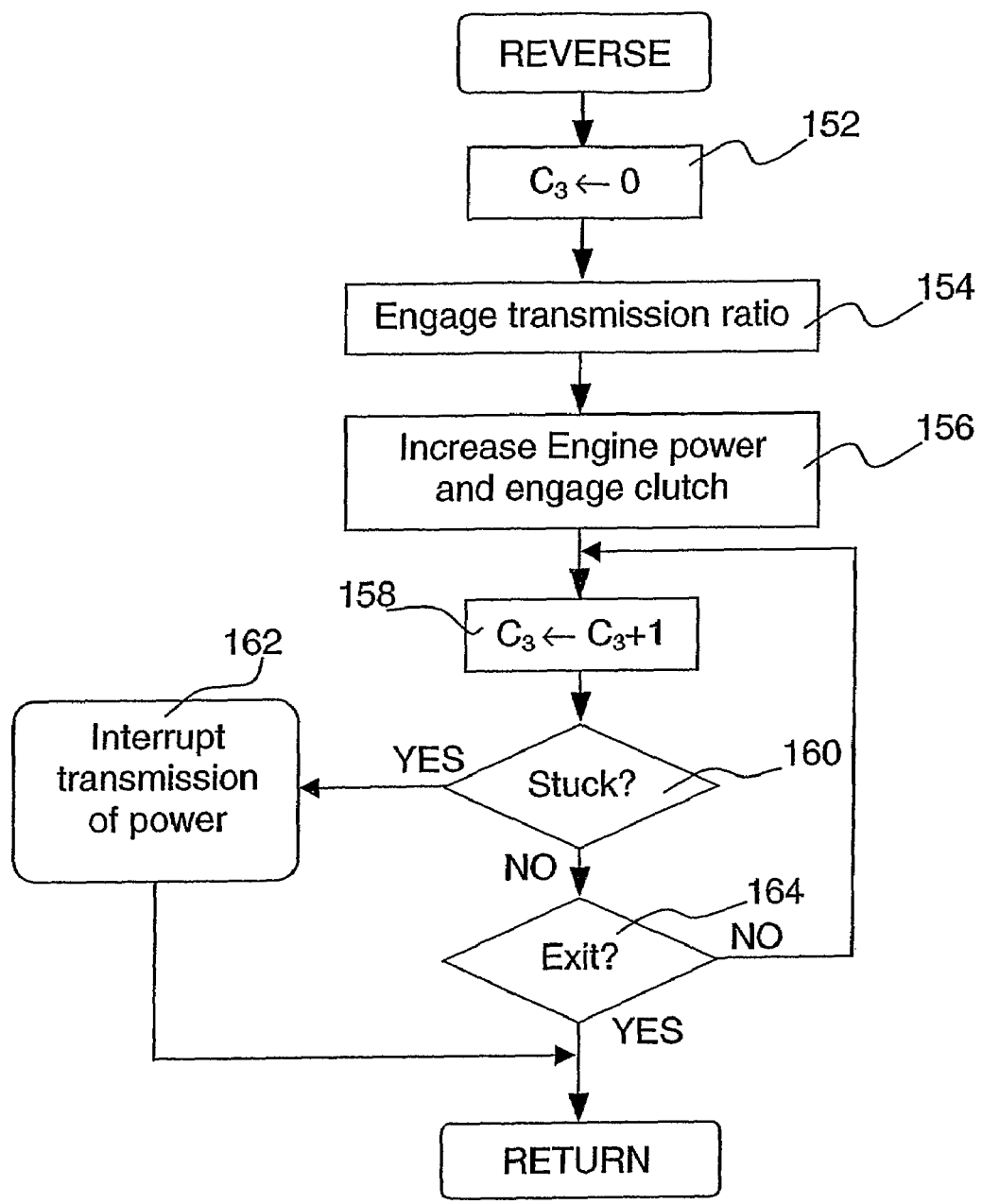
FIG. 4 is a flowchart illustrating process logic of a subroutine of the routine of FIG. 2.

The subroutine REVERSE is illustrated in FIG. 4. In function block 152, a counter $C_3$ is reset to zero. In functional block 154, the electronic control unit activates the transmission control subunit 74 to engage a transmission ratio in the direction opposed to the desired travel direction, said transmission ratio being determined based on the state of the counter and/or the position of the accelerator pedal. The subroutine continues to function block 156 to activate the engine control subunit 70 to determine the engine power based on the position of the accelerator pedal 38, and activates the main clutch control subunit 72 to engage the main clutch 18. The routine then continues to function block 158 to increment the counter $C_3$ and moves to decision block 160.

In decision block 160, the electronic control unit 34 determines if a stuck condition has been detected in the direction opposed to the desired travel direction. The test is very similar to the test of decision block 122. If the wheel spin is lower than the threshold, the routine branches to decision block 164.

In decision block 164, the electronic control unit decides if an exit condition is fulfilled. The exit condition is fulfilled if the value of the counter $C_3$ is greater than a predetermined value, or if the vehicle speed is greater than a predetermined value or if the vehicle has traveled a distance greater than a predetermined limit in the direction opposed to the desired travel direction or if the switch 46 has been switched off, or if the brake pedal has been depressed or if the accelerator pedal has been released. In these cases, the subroutine is terminated. If the exit condition is not fulfilled, the subroutine jumps back to functional block 158 to increment the counter.

If in decision block 160 the wheel spin is greater than a specified threshold, the routine branches to function block 162, where the subroutine INTERRUPT is called to interrupt the transmission of power to the drive wheels. The subroutine INTERRUPT has been described before in connection with function block 130. It will be appreciated, however, that the parameters of the subroutine INTERRUPT can be different for the desired travel direction and for the opposed direction. In particular, the predetermined values used in decision block 138 may be different.

While preferred embodiments of the invention have been described, it is to be understood by those skilled in the art that the invention is naturally not limited to these embodiments. Many variations are possible.

For example, the vehicle speed or acceleration can also be used as parameters for determining a stuck condition of the vehicle. For instance, the stuck condition will be fulfilled if the vehicle speed is lower than a predetermined value. Advantageously, vehicle speed or acceleration and wheel spin are used conjointly: for instance, more wheel spin may be allowed if it causes the vehicle to accelerate. The slip threshold can be a constant value, or it can be made dependent on the position of an accelerometer, and/or a value of the counter $C_l$ (how many times the powering step has been repeated).

In many cases, the vehicle will be provided with a traction control system that automatically brakes individual wheels to limit slip during acceleration. If that is the case, it can be advantageous to run the traction control in parallel with routine 100, in particular if the transversal differentials are not lockable. Alternatively, it is also acceptable to automatically discontinue the traction control while the routine 100 is carried out. It can also be advantageous to activate the locks of the lockable transversal differentials 24, 28 and/or a lock of the longitudinal transfer case 22.

The subroutine REVERSE is optional; therefore, blocks 140 and 150 can be omitted and the subroutine 130 can directly loop to function block 110. The decision block 124 can be located before decision block 122.

An internal and/or external buzzer can be activated when the start-up mode is activated so that the driver and/or persons about the vehicle can be alerted, in particular when the reverse start-up procedure is implemented.

The electronic control unit can be replaced by several control units, such as an engine control unit, a transmission control unit, a main clutch control unit and the like.

The transmission can be a stepped transmission or a continuously variable transmission. The transmission can be a manual transmission, as long as the main clutch 18 is operated automatically. In such a case, the reverse mode is not provided. The routine will be carried out on the basis of the gear manually selected by the driver.

The invention can be incorporated not only in vehicles with an internal combustion engine, but also into vehicle with other type of engines or motors, such as electric motors or hybrid power systems. The invention can also be incorporated in a vehicle with only one drive wheel, a set of drive wheels, or where all wheels of the vehicle are driven.

What is claimed is:

1. A method for automated control of a drive train of a land vehicle with at least one drive wheel to be executed when ground conditions exist that impede the initiation or continuation of travel of the land vehicle, said method comprising the steps of:

determining, in the land vehicle, that a ground condition exists that impedes an initiation or continuation of travel of the land vehicle;

applying drive power, via the drive train of the land vehicle, to at least one drive wheel of the land vehicle in an attempt to cause productive travel of the land vehicle and continuing the application of drive power until a predetermined condition of unproductive vehicle travel progress has been detected, said condition of unproductive vehicle travel progress being prescribed as a sensed condition indicative that travel progress of the powered vehicle, relative to the ground desired to be traversed, has fallen below a threshold measure; and controlling, via an automated drive train control routine, execution of the application step of drive power to the drive wheel in an attempt to cause productive travel of the land vehicle responsive to a driver-initiated signal; discontinuing drive power to the drive wheel of the land vehicle until a predetermined power resumption condition occurs;

reapplying drive power to the drive wheel of the land vehicle for the purpose of continuing productive powered travel of the land vehicle; and controlling, via the automated drive train control routine, execution of the steps of application, discontinuation, and reapplication of drive power to the drive wheel of the land vehicle responsive to the driver-initiated signal.

2. The method as recited in claim 1, further comprising the step of: applying a reverse direction drive power, via the drive train of the land vehicle, to the drive wheel of the land vehicle between the steps of discontinuation and reapplication of drive power to the drive wheel, and continuing the application of the reverse direction drive power until a predetermined condition of unproductive vehicle reverse travel progress has been detected, said condition of unproductive vehicle reverse travel progress being prescribed as a sensed condition indicative that reverse travel progress of the powered vehicle, relative to the ground desired to be traversed, has fallen below a threshold measure.

3. The method as recited in claim 2, further comprising the step of: repeating, following an initial application of drive power to the drive wheel of the land vehicle, the steps of discontinuation, reverse application, and reapplication of drive power to the drive wheel of the land vehicle until a predetermined condition of continued productive travel is determined.

4. The method of claim 2, wherein the step of applying reverse direction drive power further comprises reducing to zero the power transmitted to the drive wheel when a reverse mode stop condition is fulfilled, said reverse mode stop condition including at least one of the following conditions: the land vehicle has covered more than a predetermined distance in a direction opposed to a desired travel direction; and the land vehicle speed is above a predetermined vehicle speed threshold value in the direction opposed to the desired travel direction.

5. The method as recited in claim 1, further comprising the step of: disabling an automated travel initiation control mode when a predetermined condition of continued productive travel is detected.

6. The method as recited in claim 1, further comprising the step of: repeating, following an initial application of drive power to the drive wheel of the land vehicle, the steps of discontinuation and reapplication of drive power to the drive wheel of the land vehicle until a predetermined condition of continued productive travel is determined.

7. The method as recited in claim 6, further comprising the step of: permitting the automated execution of the steps of application, discontinuation, and reapplication of drive power to the drive wheel of the land vehicle only when a driver of the land vehicle has manually selected an automated travel initiation control mode for the drive train of the land vehicle.

8. The method as recited in claim 1, wherein the driver-initiated signal that initiates the automated drive train control routine that executes the steps of application, discontinuation, and reapplication of drive power to the drive wheel of the land vehicle is driver-depression of an accelerator.

9. The method as recited in claim 8, further comprising the step of: disabling accelerator control of the land vehicle during execution of the automated drive train control routine so that a degree of depression of the accelerator during the automated routine has no effect on the execution of the routine.

10. The method as recited in claim 8, further comprising the step of: adapting performance of the automated drive train control routine that controls execution of the steps of application, discontinuation, and reapplication of drive power to the drive wheel of the land vehicle based on a degree of driver-depression of the accelerator.

11. The method as recited in claim 1, further comprising the steps of: basing said detection of a predetermined condition of unproductive vehicle travel progress on at least one signal selected from the group consisting of: a non-driven wheel speed signal; a drive wheel speed signal; a drive train revolution speed signal; a drive train torque signal; a vehicle speed signal; an acceleration signal of a suspended body of the land vehicle; and an acceleration signal of non-suspended part of the land vehicle; and comparing said at least one signal with a predetermined threshold value for controlling execution of the automated drive train control routine.

12. The method as recited in claim 1, further comprising the steps of: differentiating productive from unproductive vehicle travel progress based on at least one of the following: a comparison between rotational speeds of the drive wheel and a non-driven wheel; and a comparison between rotational speed of the driven wheel and a measured ground speed of the land vehicle.

13. The method as recited in claim 1, further comprising the step of: disabling the automated drive train control routine based upon the occurrence of at least one of the following conditions: a predetermined distance of productive travel of the land vehicle is achieved; a predetermined speed of the land vehicle is achieved; a brake pedal (40) of the land vehicle is depressed; depression of the accelerator (38) of the land vehicle is released; and a driver-initiated disabling command is received.

14. A land vehicle drive train control device comprising a processor and readable medium configured and programmed to execute a method for automated control of a drive train of a land vehicle with at least one drive wheel to be executed when ground conditions exist that impede the initiation or continuation of travel of the land vehicle, said method comprising the steps of:

determining, in the land vehicle, that a ground condition exists that impedes an initiation or continuation of travel of the land vehicle;

applying drive power, via the drive train of the land vehicle, to at least one drive wheel of the land vehicle in an attempt to cause productive travel of the land vehicle and continuing the application of drive power until a predetermined condition of unproductive vehicle travel progress has been detected, said condition of unproductive vehicle travel progress being prescribed as a sensed condition indicative that travel progress of the powered vehicle, relative to the ground desired to be traversed, has fallen below a threshold measure; controlling, via an automated drive train control routine, execution of the application step of drive power to the drive wheel in an attempt to cause productive travel of the land vehicle responsive to a driver-initiated signal;

discontinuing drive power to the drive wheel of the land vehicle until a predetermined power resumption condition occurs;

reapplying drive power to the drive wheel of the land vehicle for the purpose of continuing productive powered travel of the land vehicle; and controlling, via the automated drive train control routine, execution of the steps of application, discontinuation, and reapplication of drive power to the drive wheel of the land vehicle responsive to the driver-initiated signal.

15. A land vehicle having a drive train and control device therefore, the control device comprising a processor and readable medium configured and programmed to execute a method for automated control of the drive train of the land vehicle with at least one drive wheel to be executed when ground conditions exist that impede the initiation or continuation of travel of the land vehicle, said method comprising the steps of:

determining, in the land vehicle, that a ground condition exists that impedes an initiation or continuation of travel of the land vehicle; applying drive power, via the drive train of the land vehicle, to at least one drive wheel of the land vehicle in an attempt to cause productive travel of the land vehicle and continuing the application of drive power until a predetermined condition of unproductive vehicle travel progress has been detected, said condition of unproductive vehicle travel progress being prescribed as a sensed condition indicative that travel progress of the powered vehicle, relative to the ground desired to be traversed, has fallen below a threshold measure;

controlling, via an automated drive train control routine, execution of the application step of drive power to the drive wheel in an attempt to cause productive travel of the land vehicle responsive to a driver-initiated signal;

discontinuing drive power to the drive wheel of the land vehicle until a predetermined power resumption condition occurs;

reapplying drive power to the drive wheel of the land vehicle for the purpose of continuing productive powered travel of the land vehicle; and controlling, via the automated drive train control routine, execution of the steps of application, discontinuation, and reapplication of drive power to the drive wheel of the land vehicle responsive to the driver-initiated signal.

16. A computer readable medium comprising program code adapted to, upon execution on a computer, perform a method for automated control of a drive train of a land vehicle with at least one drive wheel to be executed when ground conditions exist that impede the initiation or continuation of travel of the land vehicle, said method comprising the steps of:

determining, in the land vehicle, that a ground condition exists that impedes an initiation or continuation of travel of the land vehicle;

applying drive power, via the drive train of the land vehicle, to at least one drive wheel of the land vehicle in an attempt to cause productive travel of the land vehicle and continuing the application of drive power until a predetermined condition of unproductive vehicle travel progress has been detected, said condition of unproductive vehicle travel progress being prescribed as a sensed condition indicative that travel progress of the powered vehicle, relative to the ground desired to be traversed, has fallen below a threshold measure;

controlling, via an automated drive train control routine, execution of the application step of drive power to the drive wheel in an attempt to cause productive travel of the land vehicle responsive to a driver-initiated signal;

discontinuing drive power to the drive wheel of the land vehicle until a predetermined power resumption condition occurs;

reapplying drive power to the drive wheel of the land vehicle for the purpose of continuing productive powered travel of the land vehicle; and controlling, via the automated drive train control routine, execution of the steps of application, discontinuation, and reapplication of drive power to the drive wheel of the land vehicle responsive to the driver-initiated signal.

17. A computer program product comprising program code on a computer readable medium for performing a method for automated control of a drive train of a land vehicle with at least one drive wheel to be executed when ground conditions exist that impede the initiation or continuation of travel of the land vehicle, said method comprising the steps of:

determining, in the land vehicle, that a ground condition exists that impedes an initiation or continuation of travel of the land vehicle;

applying drive power, via the drive train of the land vehicle, to at least one drive wheel of the land vehicle in an attempt to cause productive travel of the land vehicle and continuing the application of drive power until a predetermined condition of unproductive vehicle travel progress has been detected, said condition of unproductive vehicle travel progress being prescribed as a sensed condition indicative that travel progress of the powered vehicle, relative to the ground desired to be traversed, has fallen below a threshold measure;

controlling, via an automated drive train control routine, execution of the application step of drive power to the drive wheel in an attempt to cause productive travel of the land vehicle responsive to a driver-initiated signal;

discontinuing drive power to the drive wheel of the land vehicle until a predetermined power resumption condition occurs;

reapplying drive power to the drive wheel of the land vehicle for the purpose of continuing productive powered travel of the land vehicle; and controlling, via the automated drive train control routine, execution of the steps of application, discontinuation, and reapplication of drive power to the drive wheel of the land vehicle responsive to the driver-initiated signal.

18. A computer program product directly loadable into the internal memory of a digital computer, comprising software code portions for performing a method for automated control of a drive train of a land vehicle with at least one drive wheel to be executed when ground conditions exist that impede the initiation or continuation of travel of the land vehicle, said method comprising the steps of:

determining, in the land vehicle, that a ground condition exists that impedes an initiation or continuation of travel of the land vehicle;

applying drive power, via the drive train of the land vehicle, to at least one drive wheel of the land vehicle in an attempt to cause productive travel of the land vehicle and continuing the application of drive power until a predetermined condition of unproductive vehicle travel progress has been detected, said condition of unproductive vehicle travel progress being prescribed as a sensed condition indicative that travel progress of the powered vehicle, relative to the ground desired to be traversed, has fallen below a threshold measure;

controlling, via an automated drive train control routine, execution of the application step of drive power to the drive wheel in an attempt to cause productive travel of the land vehicle responsive to a driver-initiated signal;

discontinuing drive power to the drive wheel of the land vehicle until a predetermined power resumption condition occurs;

reapplying drive power to the drive wheel of the land vehicle for the purpose of continuing productive powered travel of the land vehicle; and controlling, via the automated drive train control routine, execution of the steps of application, discontinuation, and reapplication of drive power to the drive wheel of the land vehicle responsive to the driver-initiated signal.

* * * * *